United States Patent Office
3,086,637
Patented Apr. 23, 1963

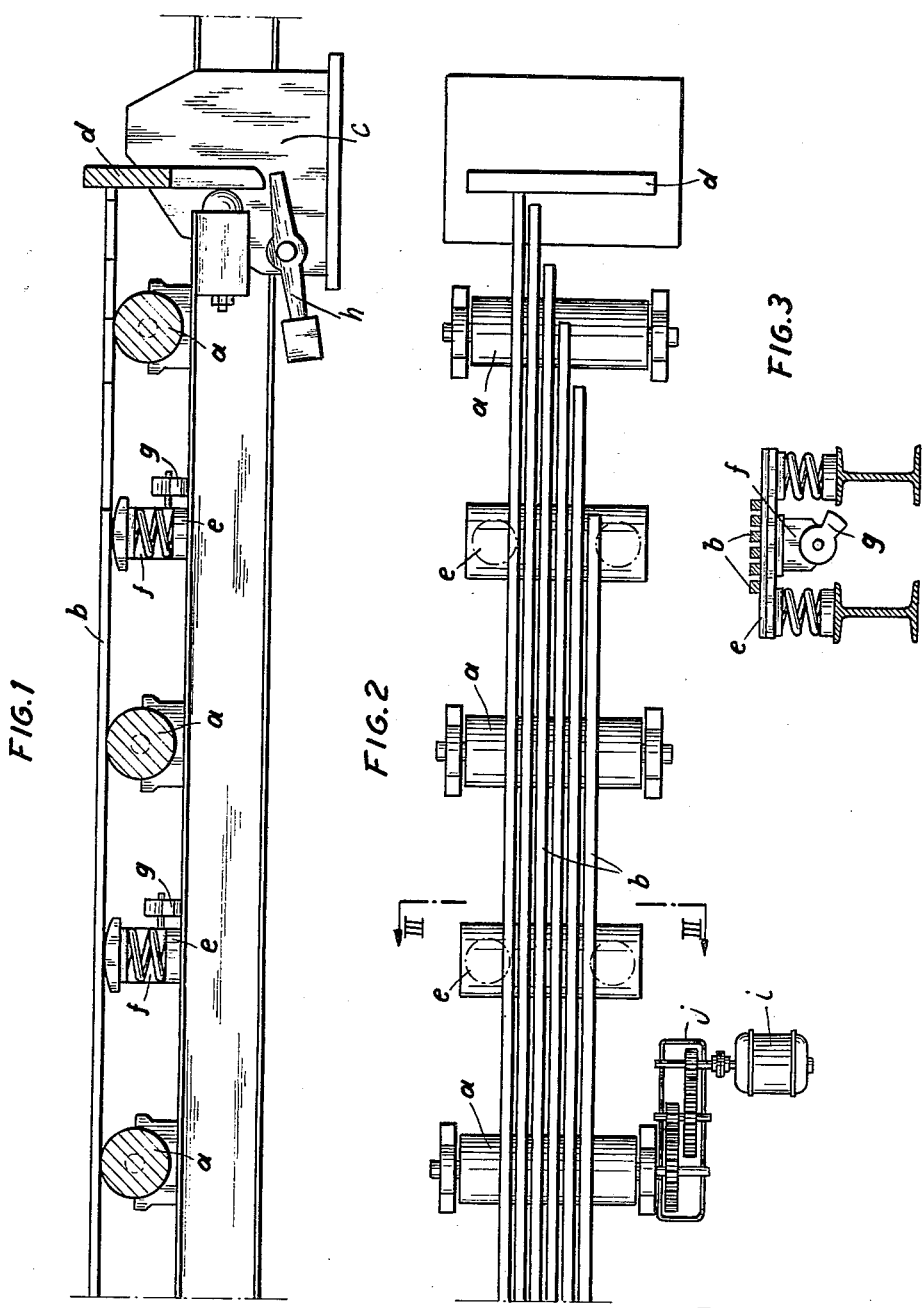

3,086,637
ROLLER TRACKS
Rudolf Graef, Oberhausen, Rhineland, Germany, assignor to Huttenwerk Oberhausen Aktiengesellschaft, Oberhausen, Germany, a body corporate of Germany
Filed Oct. 16, 1959, Ser. No. 846,905
Claims priority, application Germany Oct. 23, 1958
4 Claims. (Cl. 198—29)

For cutting bundles of rods of small section coming from a rolling mill the rods are conveyed along a roller track to the shears but the forward ends of the rods do not all arrive at the shears at the same level, i.e. flush with each other. The distance between the front end of the first rod which arrives there and the front end of the last rod can be quite considerable. It is customary not to start cutting the rods until all the rods are under the shears. The last cut is made when all the rods are still under the shears. There is therefore a great deal of waste both at the first and at the last cut due to the unevenly projecting ends. This considerably impairs the economy of the plant.

To obviate this disadvantage, particularly when cutting rods of thick cross-section, the rods are conducted before reaching the shears to a stop bar which can be raised into the path of the rods on the rollers and lowered again. The stop is lowered again as soon as all the ends of all the rods abut against it. In this way practically all the rods will come under the shears simultaneously, so that they can all be cut to the same lengths with very little waste.

This method is only of limited usefulness for rods of thin section, because, when the rods abut against the stop, they cannot offer sufficient resistance to the forward movement exerted by the rollers, so that they move sideways. In addition, thin rods can become entangled with each other when they are withdrawn from the hot table onto the roller track. This entanglement causes the rods to move forwards unevenly to the stop.

The invention obviates this disadvantage by providing one or more vibratory devices spaced along the path of the rods on the roller track in front of the stop. With a hot table of 100 m. in length, as many as 10 to 20 vibrators may be provided. These vibrators briefly lift the rods from their supports at repeated intervals corresponding to the frequency of the vibrations. The vibrations coupled with the brief interruptions in the forward push on the rods reduces the friction of the rods against each other and disentangles them, so that they meet the stop in orderly fashion and with reduced force, their forward ends all being level with each other at the stop. As a result, waste is reduced to a minimum, particularly for the first cut.

The drawing shows diagrammatically a constructional example of a roller track in accordance with the invention.

FIGURE 1 shows the roller track in elevation, and
FIGURE 2 is a plan view of FIGURE 1.
FIGURE 3 is a cross-sectional view of the vibrators $e$ of FIGURE 2 taken along the line III—III of FIG. 2.

Referring to the drawing, the rods lying on the rollers $a$ of the roller track, which are drive rollers, are indicated by the reference letter $b$. The rods are conducted to the stop $c$, which can be alternately raised and lowered, in such a manner that all their front ends will come to lie flush against the plate $d$ of the stop. For example, pivoted arm $h$ may be rotated clockwise so that gravity forces permit plate $d$ to drop below the horizontal plane of the rods $b$. This is prevented by the friction between the closely adjacent rods.

According to the invention, a number of vibrators $e$ are arranged between the rollers $a$. These vibrators vibrate the rods and thereby reduce or eliminate the friction between them and help to disentangle the rods and at the same time exert a braking action on them, so that the ends of the rods will all come to lie in front of the stop without any deformation of the rods. The vibrator nearest to the stop is some distance away from the stop. It is to be noted that in FIGURE 2 only one drive roller is shown driven by motor $i$ and gear train $j$. It is to be understood that the remaining drive rollers may be driven by conventionally coupling each respective drive roller to the motor $i$ through a suitable gear train or by individually driving these rollers by a motor and gear train similar to that shown in FIGURE 2.

The vibrators may be of any desired construction. By way of example, the shaking device may be an electrical vibrator or a mechanical pulsator which is excited by a rotating inbalance. FIGURE 3 shows, by way of example only, a well known shaking device of the vibrator spring-mass system type. The mass comprises a head which engages the rods $b$ and an inbalance $g$, which is driven by a drive $f$. As the inbalance $g$ oscillates the surface of the shaking device $e$ which is in engagement with the rods $b$ is caused to vibrate or shake.

It is to be understood that the specific shaking device disclosed in FIGURE 3 is merely one example of a plurality of well-known shaking devices which may be incorporated into the apparatus of the present invention.

Another type of shaking device, of course, is the well-known A.C. magnet. The A.C. magnets of the shaking device generate vibrations so as to produce a shaking movement or oscillation of the surface of the shaking device. By way of example only, the A.C. magnet may be disposed within the spring members shown in FIGURE 3 and attached so as to cause the head $e$ to oscillate or shake.

I claim:
1. A roller track for conveying rolled rods to cutting shears comprising: a plurality of rolled rods; a plurality of drive rollers for driving said rods along said track; means for driving said rollers; stop means adjacent one end of said track against which the forward moving ends of said rods abut prior to cutting thereof; means for raising and lowering said stop means; at least one vibratory device positioned along said track for repeatedly lifting said rods off said rollers for a short interval of time; said repeatedly lifting of said rods off said drive rollers causing an intermittent stoppage of the forward movement of said rods so as to reduce the friction between said rods for a short interval of time and said drive rollers and vibratory device each being positioned perpendicular to the longitudinal axis of said rods and below said rods.

2. A roller track in accordance with claim 1 wherein said drive rollers and said vibratory device each also being positioned perpendicular to the movement of said rods and below said rods.

3. A roller track in accordance with claim 2 wherein said intermittent stoppage of the forward movement of said rods further causing the forward moving ends of said rods to line up in abutment with said stop means when said stop means is in a raised position.

4. A roller track for conveying rolled rods to cutting shears comprising: a plurality of rolled rods; a plurality of driven rollers for driving said rods along said track; said rollers being positioned perpendicular to the direction of movement of said rods and below said rods; means for driving said rollers; stop means adjacent one end of said track against which the forward moving ends of said rods abut prior to cutting thereof; means for raising and lowering said stop means at predetermined periods for permitting said rods to be cut, and a plurality of vibratory devices each positioned perpendicular to the direction of movement of said rods and below said rods; said vibratory devices each periodically raising and lowering said rods as they pass thereover; and said periodic raising and lowering of said rods causing a brief stoppage of the forward movement of said rods so as to reduce the friction between and entanglement of said rods so that said forward ends of said rods will line up in abutment with said stop means when said stop means is in a raised position.

References Cited in the file of this patent

UNITED STATES PATENTS

| | | |
|---|---|---|
| 1,728,538 | Gentil et al. | Sept. 17, 1929 |
| 2,234,162 | Anderson | Mar. 11, 1941 |
| 2,453,401 | Beeching | Nov. 9, 1948 |
| 2,608,286 | Henschker | Aug. 26, 1952 |

FOREIGN PATENTS

| | | |
|---|---|---|
| 755,132 | France | Sept. 4, 1933 |
| 1,211,064 | France | Oct. 5, 1959 |